United States Patent [19]

Benner et al.

[11] 3,901,651

[45] Aug. 26, 1975

[54] TREATING WATER TO RETARD CORROSION

[75] Inventors: Robert S. Benner, Blissfield; Larry A. Green, Adrian, both of Mich.

[73] Assignee: Aquaphase Laboratories, Inc., Adrian, Mich.

[22] Filed: Mar. 1, 1973

[21] Appl. No.: 337,106

Related U.S. Application Data

[63] Continuation of Ser. No. 150,829, June 7, 1971, abandoned, which is a continuation of Ser. No. 783,394, Dec. 12, 1968, abandoned.

[52] U.S. Cl. ............ 21/2.7 A; 21/2.7 R; 134/22 R; 210/58; 252/85; 252/181; 252/389 R; 252/389 A
[51] Int. Cl.² ... C23F 11/16; C23F 11/18; C23F 14/02
[58] Field of Search .......... 252/175, 81, 83, 84, 85, 252/147, 178, 180, 181, 389 A, 389 R, 395; 134/2, 3, 22, 41; 210/42, 51, 57, 58; 106/14; 21/2.5 A, 2.5 R, 2.7 A, 2.7 R

[56] References Cited
UNITED STATES PATENTS

| | | | |
|---|---|---|---|
| 2,505,457 | 4/1950 | Bird | 210/23 |
| 3,188,289 | 6/1965 | Kahler | 210/58 |
| 3,256,203 | 6/1966 | Robertson | 252/178 |
| 3,303,139 | 2/1967 | Blaser | 252/180 |
| 3,336,221 | 8/1967 | Ralston | 210/58 |
| 3,413,231 | 11/1968 | Kolodny | 252/171 |
| 3,445,400 | 5/1969 | Everhart | 252/389 |
| 3,483,133 | 12/1969 | Hatch | 252/389 |
| 3,487,018 | 12/1969 | Troscinski | 210/58 |
| 3,496,222 | 2/1970 | Quimby | 252/82 |
| 3,505,243 | 4/1960 | Steinberg | 252/353 |
| 3,639,263 | 2/1972 | Troscinski et al. | 21/2.7 X |

*Primary Examiner*—Benjamin R. Padgett
*Assistant Examiner*—Irwin Gluck
*Attorney, Agent, or Firm*—Barnes, Kisselle, Raisch & Choate

[57] ABSTRACT

A method of retarding corrosion of metal parts in a water system which comprises adding a composition containing a water soluble phosphone or phosphine, a water soluble sulfonated lignin, and a water soluble cation.

10 Claims, No Drawings

TREATING WATER TO RETARD CORROSION

This application is a continuation of application Ser. No. 150,829, filed June 7, 1971 and now abandoned which is in turn a continuation of application Ser. No. 783,394, filed Dec. 12, 1968, now abandoned.

This invention relates to inhibiting and retarding the corrosion of metal parts in industrial water systems.

BACKGROUND OF THE INVENTION

A major problem in industrial water systems such as cooling towers is the corrosion of metal parts which are in contact with the water in the system. Such metal parts comprise iron and steel parts as well as copper, copper base alloys and other metals.

It has heretofore been suggested that the addition of water soluble phosphates and water soluble chromates will inhibit corrosion in such water systems. However, among the problems inherent with the use of such materials is that a very accurate control of pH is necessary to obtain corrosion protection, keep pitting to a minimum, and to restrict sludge in the system. Specifically the phosphate tends to cause sludge problems in recirculating cooling tower systems in which high hardness is present. The complex phosphate reverts to the ortho state and forms calcium phosphate deposits. In addition the phosphates comprise a bacterial food which is undesirable. Chromates tend to be toxic and to cause pitting when insufficient chromate is provided.

Among the objects of the present invention are to provide a method and composition for inhibiting and retarding corrosion of metal parts in industrial water systems; which method and composition are effective to reduce pitting and tuberculation; which method and composition do not precipitate out and form objectionable deposits; which method and composition do not require control of the pH; which method and composition has low toxicity; and which method and composition may be utilized in stagnant as well as moving water applications.

DESCRIPTION

Basically, the method embodying the invention comprises the addition of a water soluble phosphone or phosphine, a water soluble sulfonated lignin and a water soluble cation.

Among the phosphones and phosphines which have produced satisfactory results are a 1-hydroxyethylidene-1, 1-diphosphonic acid, a pentasodium tris methylphosphonate salt, pentasodium salt, nitrilo tri (methylene phosphonic acid), benzene phosphonic acid, bis phosphonylmethyl phosphonic acid, tri-phenyl phosphine and tri-butylphosphine.

The structural formula of amino tris phosphonic acid is

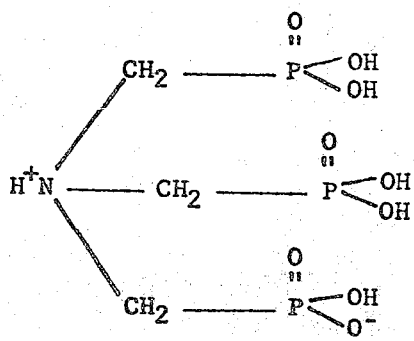

The above product is commercially available under the trademark "DEQUEST" 2000, a product of the Monsanto Company, St. Louis, Mo.

The structural formula of 1-hydroxyethylidene-1, 1-diphosphonic acid is

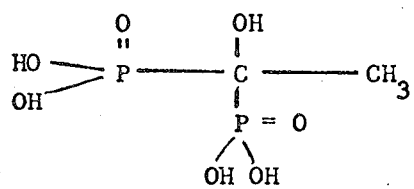

The above product is commercially available under the trademark "DEQUEST 2010," a product of Monsanto Company, St. Louis, Mo.

The structural formula of pentasodium salt, nitrilo tri (methylene phosphonic acid) is

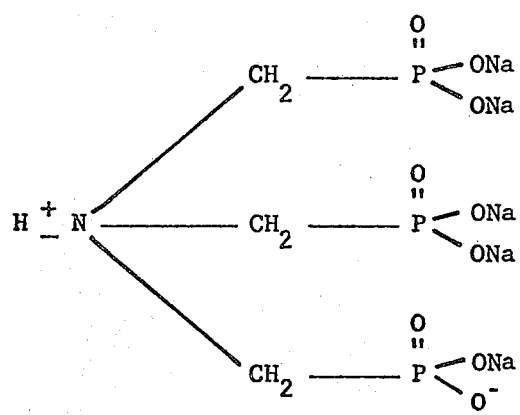

The above product is commercially available under the trademark "DEQUEST 2006," a product of Monsanto Company, St. Louis, Mo.

The structural formula of benzene phosphonic acid is

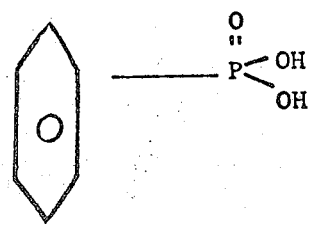

Thus phosphones and phosphines utilized in the present invention are selected from one of the following basic structural formulas:

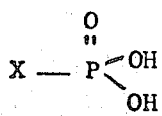   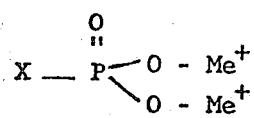

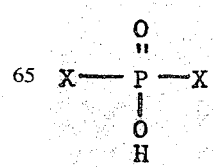   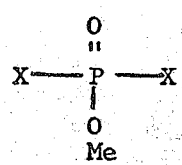

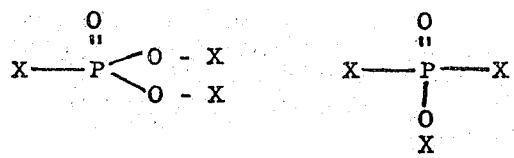

where X = aromatic, aliphatic, or cyclic hydrocarbons with or without nitrogen sulfur, phosphorous, hydroxy groups, carboxy or other reactive groups. Me = metal.

Sulfonated lignin comprises a group of compounds known as hetero-dispersed polymers whose molecular weights vary between 1,000 and 2,000. Such compounds are obtained in the wood processing industry. As is well known, lignin has the general formula $(C_{10}H_{13}O_3)_x$. Such molecules are joined in the form $(C_6H_4)(OCH_3)(C_3H_6O)$. A satisfactory sulfonated lignin which has been used comprises products sold by the American Can Company under the trademark "NOR-LIG 12" and has the following composition:

| | |
|---|---|
| pH of a 3% solution | 3.0 to 3.5 |
| Sulphur, as elemental sulfur | 5.6% |
| Sulfate, as elemental sulfur | 7.3% |
| Sulfite sulfur, as elemental sulfur | .10% |
| Sulfur as Sulfone | 3.5 to 4.0% |
| Calcium oxide | .41% |
| Magnesium oxide | .21% |
| Sodium oxide | 5.45% |
| Reduced sugars | 23.20% |
| Methoxy groups | 7.61% |

It has been found that the sulfonated lignin must in order to produce the best results comprise components which are easily oxidizable to $\alpha$ carboxylic acid, $\beta$ carboxylic acid, mixtures of the two or other such acids. The aforementioned "NORLIG 12" product contains reduced sugars which result in the desired carboxylic acids. The effectiveness of sulfonated lignin containing reduced sugars which produces $\alpha$ and $\beta$ carboxylic acid or sulfonated lignin containing such acids is shown by tests hereinafter set forth.

The organic structure of such compounds has not been completely determined but it is known that the basic lignin monomer unit is a substituted phenyl propane. A section of the polymeric lignin sulfonic acid could have the following structure:

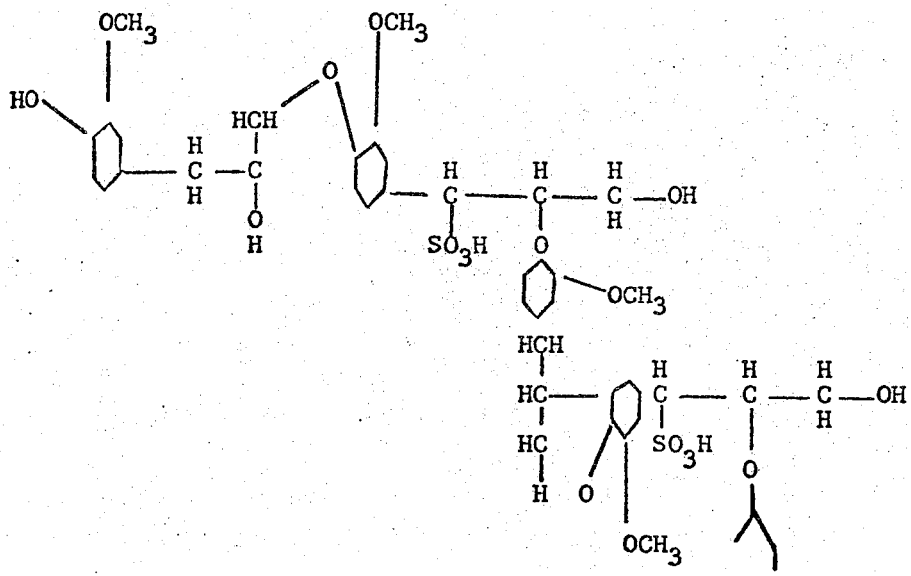

Among the metal cations that can be used in accordance with the invention are nickel, zinc, lead, cobalt, magnesium, antimony, tin and chromium.

Zinc, chromium and cadmium are preferred and as will be apparent from the test below, a mixture of zinc and cadmium produces best results.

Test Conditions

Test stations were utilized comprising plastic pails containing 2500 milliliters of solution into which were hung four standard metal strips (strips were of the type described in ASTM Special Technical Publication No. 148-1 titled Manual on Industrial Water and Industrial Waste Water, Second Edition 1966). The containers were agitated and aerated by bubbling air to the containers. The water utilized in the containers was de-ionized water and tap water of Adrian, Michigan, having the following analyses:

| | Adrian City Water Supply | De-Ionized Water |
|---|---|---|
| Total Hardness as $(CaCO_3)$ | 130 – 180 | 0 |
| $Ca^{++}$ as $(CaCO_3)$ | 60 | 0 |
| $Mg^{++}$ as $(CaCO_3)$ | 70 | 0 |
| Phenolphthalien Alkalinity as $(CaCO_3)$ | 48 | 0 |
| Methyl Orange Alkalinity as $(CaCO_3)$ | 80 | 1 |
| $SO_4^{--}$ as $(SO_4)$ | 74 | 0 |
| $Cl^-$ as $(Cl)$ | 16 | 1 |
| $SiO_2$ as $(SiO_2)$ | 6.7 | 0 |
| pH | 10.2 | 5.5 |
| Specific Conductance — micromhos | 300 | 12 |

The specimens comprised metal strips of cold rolled steel having the following composition:

| | |
|---|---|
| Mn | 0.5% |
| Cr | 0.2 |
| Cu | 0.05 |
| Ni | 0.05 |
| C | 0.1 |
| Fe | bal |

The metal strips comprise cold rolled steel with each strip averaging 4.0 to 4.9 grams in weight and having dimensions of 0.375 inches width, 0.028 inches thickness, and 3.255 inches length. A three-eighths inch hole was drilled approximately one-fourth inch from one end. The strips are cleaned in the manner afore-mentioned in the ASTM publication, degreased with alcohol, cleaned with acid, rinsed with a basic compound and dried with alcohol. The strips are further dried in an oven to insure dryness before initial weighing. The same basic procedure was followed for the final weighing after exposure except that the time for application of the acid was limited to 20 seconds.

The time that each strip remained in contact with a solution varied from 6 to 30 days.

During the tests, the pH of each solution was checked daily and the average temperature was 80° F. ± 5°. Make-up solution was added having the same concentration as the initial solution as required to make up for evaporation.

When a strip was removed from the test solution, it was given an initial examination for tuberculation, slime and the like. After the strips were cleaned and weighed, they were examined for depth of craters, amount of pitting and areas pitted.

The standard ASTM formula for mils per year penetration was used as follows:
Mils Per Year Penetration =

$$\left(\frac{1}{\frac{1}{\text{with}} + \frac{1}{\text{length}} + \frac{1}{\text{thickness}}}\right) \left(\frac{\text{weight initial - weight final}}{(\text{weight initial})(\text{days exposure})}\right) \times 1.82 \times 10^5$$

Table I below shows comparative tests in mils per year penetration of compositions embodying the invention as contrasted to other corrosion inhibiting treatments. As exemplified by specimens 1–3, increased corrosion inhibition and retardation is achieved in accordance with the invention, as contrasted to other phosphate or chromate treatments. This corrosion inhibition is achieved without the limitations of toxicity or pH control.

TABLE I

| NO. | ADDITIVE | ppm | pH | mpy |
|---|---|---|---|---|
| 1. | Phosphone | 9 | 6.5 – 7.0 | 0.73 |
|  | Sulphonated Lignin | 15 | 7.0 – 7.5 | 0.40 |
|  | Zinc | 6 |  |  |
| 2. | Phosphone | 12 | 6.5 – 7.0 | 0.45 |
|  | Sulphonated Lignin | 20 | 7.0 – 7.5 | 0.60 |
|  | Zinc | 8 |  |  |
| 3. | Phosphone | 15 | 6.5 – 7.0 | 0.39 |
|  | Sulphonated Lignin | 25 | 7.0 – 7.5 | 0.32 |
|  | Zinc | 10 |  |  |
| 4. | CrO₄ | 12.5 | 6.5 – 7.0 | 0.47 |
|  | Polyphosphate | 0.015 | 7.0 – 7.5 | 0.31 |
|  | Ortho Phosphate | 0.015 |  |  |
|  | Zinc | 4.5 |  |  |

TABLE I-Continued

| NO. | ADDITIVE | ppm | pH | mpy |
|---|---|---|---|---|
| 5. | CrO₄ | 25 | 6.5 – 7.0 | 0.41 |
|  | Polyphosphate | 0.030 | 7.0 – 7.5 | 0.27 |
|  | Ortho Phosphate | 0.030 |  |  |
|  | Zinc | 9.0 |  |  |
| 6. | CrO₄ | 37 | 6.5 – 7.0 | 0.33 |
|  | Polyphosphate | 0.045 | 7.0 – 7.5 | 0.22 |
|  | Ortho Phosphate | 0.045 |  |  |
|  | Zinc | 13.5 |  |  |
| 7. | CrO₄ | 28.5 | 6.5 – 7.0 | 1.11 |
|  | Polyphosphate | 0.9 | 7.0 – 7.5 | 1.22 |
|  | Ortho Phosphate | 0.55 |  |  |
|  | Zinc | 1.35 |  |  |
| 8. | CrO₄ | 57 | 6.5 – 7.0 | 0.68 |
|  | Polyphosphate | 1.8 | 7.0 – 7.5 | 0.91 |
|  | Ortho Phosphate | 1.1 |  |  |
|  | Zinc | 2.7 |  |  |
| 9. | CrO₄ | 114 | 6.5 – 7.0 | 0.76 |
|  | Polyphosphate | 2.7 | 7.0 – 7.5 | 0.48 |
|  | Ortho Phosphate | 1.68 |  |  |
|  | Zinc | 4.05 |  |  |
| 10. | Polyphosphate | 1.63 | 6.5 – 7.0 | 3.52 |
|  | Ortho Phosphate | 0.34 | 7.0 – 7.5 | 1.79 |
|  | Zinc | 0.12 |  |  |
| 11. | Polyphosphate | 3.25 | 6.5 – 7.0 | 1.49 |
|  | Ortho Phosphate | 0.68 | 7.0 – 7.5 | 1.23 |
|  | Zinc | 0.24 |  |  |
| 12. | Polyphosphate | 4.88 | 6.5 – 7.0 | 10.15 |
|  | Ortho Phosphate | 1.0 | 7.0 – 7.5 | 2.63 |
|  | Zinc | 0.36 |  |  |
| 13. | Phosphone | 7.2 | 6.5 – 7.0 | 0.94 |
|  | CrO₄ | 60 | 7.0 – 7.5 | 1.41 |
|  | Zinc | 6.4 |  |  |
| 14. | Phosphone | 5.4 | 6.5 – 7.0 | 1.39 |
|  | CrO₄ | 45 | 7.0 – 7.5 | 1.17 |
|  | Zinc |  |  |  |
| 15. | Blank Water |  |  | 27.55 |

The phosphone in the above comprised a mixture of 90 percent 1-hydroxyethylidene-1, 1-diphosphonic acid and 10 percent pentasodium salt, nitrilo tri (methylene phosphonic acid) which is commercially available under the trademark "DEQUEST 2029." The sulfonated lignin comprised "NORLIG 12."

Table II represents the visual analyses of certain of the specimens of Table I as follows:

TABLE II

SPECIMEN CONDITIONS

| | Additive | pH | Number Examined | General Observations and Conclusions |
|---|---|---|---|---|
| 13 + 14 | Chromate Phosphone Zinc | 6.5 – 7.5 | 8 | Attack varied from general light surface attack to numerous pits |
| 1–3 | Phosphone Zinc Sulfonated Lignin | 6.5 – 7.8 | 8 | Light general surface attack, numerous minute pits, to no pits |
| 7–9 | Chromate Phosphate Zinc | 6.5 – 7.5 | 14 | Attack varied from few deep pits to numerous deep pits |
|  | Test Water | — | 16 | Badly corroded away |

The phosphone in the above comprises a mixture of 90 percent 1-hydroxyethylidene-1, 1-diphosphonic acid and 10 percent pentasodium salt, nitrilo tri (methylene phosphonic acid) which is commercially available under the trademark "DEQUEST 2029," a product of Monsanto Company, St. Louis, Mo. The sulfonated lignin comprised "NORLIG 12."

The visual analyses shows that when chromate treatment was used, there were not as many pits but the pitting was much deeper. When the composition embodying the invention was used, pitting was more general but the pits were smaller in diameter and not as deep. The general weight loss between the two was approximately the same. When phosphone was used with the chromate, the same type of pitting occurred as with chromate and phosphate, but the weight loss was not as great.

It was observed that specimens 1-3 produced an overall light pitting as contrasted to the chromate or chromate phosphate treatments as in examples 7-9, 13 and 14.

Tests were conducted in order to determine the pH dependency and are summarized in Table III as follows:

TABLE III

| Phosphone | 10% | (60% Active) |
| Sulfonated Lignin | 10% | |
| $ZnSO_4$ | 10% | (36.0% $Zn^{++}$) |

| No. | ppm | pH | mpy |
|---|---|---|---|
| 1. | 100 | 6.5 – 7.0 | 1.66 |
| | 150 | 6.5 – 7.0 | 0.73 |
| | 200 | 6.5 – 7.0 | 0.45 |
| | 250 | 6.7 – 7.0 | 0.39 |
| 2. | 100 | 7.0 – 7.5 | 0.87 |
| | 150 | 7.0 – 7.5 | 0.40 |
| | 200 | 7.0 – 7.5 | 0.60 |
| | 250 | 7.0 – 7.5 | 0.32 |
| 3. | 100 | 7.5 – 8.0 | 0.56 |
| | 150 | 7.5 – 8.0 | 0.42 |
| 4. | 100 | 8.0 – 8.5 | 0.46 |
| | 150 | 8.0 – 8.5 | 0.45 |
| 5. | 100 | 8.5 – 9.0 | 0.45 |
| | 150 | 8.5 – 9.0 | 0.38 |

As is seen in the data, the corrosion inhibition gained by the use of the composition of the invention is not dependent upon pH. The pH was carried roughly from 6.0 to 9.0 with little or no difference in the rate of corrosion or weight loss. Again corrosion was accompanied by general surface attack, no deep craters or pitting, this would lead one to believe that the attack upon the electrolytic cell is much faster than that encompassed by the chromate, phosphate treatments or that electrolytic action is stopped faster. It could be that the attack takes place when iron is in the univalent form (Fe+1) thereby stopping iron from going to the +2 state and therefore decreasing the course of reaction.

Further tests were conducted in order to determine the efficacy of the different cations which may be summarized as follows:

TABLE IV

CATION SUBSTITUTION
Phosphone 15ppm (60% Active)
Sulphonated Lignin 10ppm

| No. | Cation | ppm | pH | mpy |
|---|---|---|---|---|
| 1. | $Ni^{++}$ | 5.0 | 6 – 7 | 9.50 |
| | $Ni^{++}$ | 10.0 | 6 – 7 | 11.66 |
| | $Ni^{++}$ | 5.0 | 7 – 8 | 13.49 |
| | $Ni^{++}$ | 10.0 | 7 – 8 | 12.55 |
| 2. | $Cd^{++}$ | 5.0 | 6 – 7 | 1.12 |
| | $Cd^{++}$ | 2.5 | 6 – 7 | 1.22 |
| | $Cd^{++}$ | 10.0 | 6 – 7 | 1.05 |
| | $Cd^{++}$ | 5.0 | 7 – 8 | 1.32 |
| | $Cd^{++}$ | 2.5 | 7 – 8 | 1.86 |
| | $Cd^{++}$ | 10.0 | 7 – 8 | 1.28 |
| 3. | $Pb^{++}$ | 2.5 | 6 – 7 | 2.96 |
| | $Pb^{++}$ | 5.0 | 6 – 7 | 2.23 |
| | $Pb^{++}$ | 10.0 | 6 – 7 | 1.92 |
| | $Pb^{++}$ | 5.0 | 5 – 7 | 9.59 |
| 4. | $Co^{++}$ | 10.0 | 6.5 – 7.5 | 2.48 |
| | $Co^{++}$ | 5.0 | 6.5 – 7.5 | 4.01 |
| | $Co^{++}$ | 2.0 | 6.5 – 7.5 | 1.26 |
| 5. | $Sb^{++}$ | 10.0 | 6.5 – 7.5 | 2.16 |
| | $Sb^{++}$ | 5.0 | 6.5 – 7.5 | 1.62 |
| | $Sb^{++}$ | 2.0 | 6.5 – 7.5 | 14.19 |
| 6. | $Sn^{++}$ | 10.0 | 6.5 – 7.5 | 2.30 |
| | $Sn^{++}$ | 5.0 | 6.5 – 7.5 | 3.37 |
| | $Sn^{++}$ | 2.00 | 5.5 – 7.5 | 3.07 |
| 7. | $Mn^{++}$ | 10.0 | 6.5 – 7.5 | 2.88 |
| | $Mn^{++}$ | 3.0 | 6.5 – 7.5 | 7.41 |
| | $Mn^{++}$ | 2.0 | 6.5 – 7.5 | 6.57 |

CATION COMBINATIONS
Phosphone — 15.0 ppm    Sulphonated Lignin — 10.0 ppm

| No. | Cation | ppm | pH | mpy |
|---|---|---|---|---|
| 1. | $Cd^{++}$ | 5.0 | 6.5 – 7.5 | 0.79 |
| | $Zn^{++}$ | 5.0 | 6.5 – 7.5 | |
| 2. | $Cd^{++}$ | 3.0 | 6.5 – 7.5 | 1.90 |
| | $Zn^{++}$ | 3.0 | 6.5 – 7.5 | |
| 3. | $Cd^{++}$ | 1.0 | 6.5 – 7.5 | 2.00 |
| | $Zn^{++}$ | 1.0 | 6.5 – 7.5 | |
| 4. | $Cd^{++}$ | 3.0 | 6.5 – 7.5 | 0.87 |
| | $Zn^{++}$ | 3.0 | 6.5 – 7.5 | |
| | $Ni^{++}$ | 3.0 | 6.5 – 7.5 | |
| 5. | $Cd^{++}$ | 2.0 | 6.5 – 7.5 | 0.88 |
| | $Zn^{++}$ | 2.0 | 6.5 – 7.5 | |
| | $Ni^{++}$ | 2.0 | 6.5 – 7.5 | |
| 6. | $Cd^{++}$ | 1.0 | 6.5 – 7.5 | 1.61 |
| | $Zn^{++}$ | 1.0 | 6.5 – 7.5 | |
| | $Ni^{++}$ | 1.0 | 6.5 – 7.5 | |

As seen from the data, zinc and cadmium were on about the same level of protection whereas nickel, cobalt, manganese, antimony, tin and lead do not afford the protection achieved by cadmium and zinc compounds. A combination of zinc and cadmium seems to afford a better composition for corrosion inhibition but the cost for cadmium may make this composition impractical. The optimum level for the cation in this combination seems to reach an optimum between 5 and 10 ppm. Above 10 ppm the effect is leveled off and does not increase to any great degree.

Additional tests were conducted in order to determine the optimum concentration of the three materials added to the water systems and may be summarized as follows in Table V:

TABLE V

OPTIMUM CONCENTRATIONS

| No. | Additive | | ppm | pH | mpy |
|---|---|---|---|---|---|
| 1. | Sulphonated Lignin | | 10 | 6.5 – 7.5 | |
| | ZnSO$_4$ | | 5 | 6.5 – 7.5 | |
| | | (a) Phosphone | 20 | 6.5 – 7.5 | 1.17 |
| | | (b) Phosphone | 15 | 6.5 – 7.5 | 0.96 |
| | | (c) Phosphone | 10 | 6.5 – 7.5 | 1.96 |
| | | (d) Phosphone | 5 | 6.5 – 7.5 | 3.12 |
| | | (e) Phosphone | 2 | 6.5 – 7.5 | 6.77 |
| 2. | Phosphone | | 15 | 6.5 – 7.5 | |
| | Sulphonated Lignin | | 10 | 6.5 – 7.5 | |
| | | (a) ZnSO$_4$ | 2 | 6.5 – 7.5 | 3.14 |
| | | (b) ZnSO$_4$ | 4 | 6.5 – 7.5 | 3.14 |
| | | (c) ZnSO$_4$ | 8 | 6.5 – 7.5 | 0.37 |
| | | (d) ZnSO$_4$ | 10 | 6.5 – 7.5 | 0.52 |
| 3. | Phosphone | | 15 | 6.5 – 7.5 | |
| | ZnSO$_4$ | | 5 | 6.5 – 7.5 | |
| | | (a) Sulphonated Lignin | 10 | 6.5 – 7.5 | 1.57 |
| | | (b) Sulphonated Lignin | 6 | 6.5 – 7.5 | 2.16 |
| | | (c) Sulphonated Lignin | 4 | 6.5 – 7.5 | 2.17 |

As is seen, the level of phosphone or phosphine should be between 10 to 20 ppm. The cation should be from 5 to 10 and sulphonated lignin from 10 to 20 ppm.

Further tests were conducted on the upper limits of the addition of materials and are summarized in the following Table VI:

TABLE VI

UPPER LIMITS OF TREATMENT

| Phosphone (60% Active) | — | 15.0% |
|---|---|---|
| Sulfonated Lignin | — | 10.0% |
| ZnSO$_4$ (36.0 Zn$^{++}$) | — | 12.0% |

| No. | ppm ADDITIVE | pH | mpy |
|---|---|---|---|
| 1. | 100 | 6.5 – 7.0 | 1.67 |
| 2. | 100 | 7.0 – 7.5 | 0.50 |
| 3. | 200 | 6.5 – 7.0 | 0.49 |
| 4. | 200 | 7.0 – 7.5 | 0.68 |
| 5. | 300 | 6.5 – 7.0 | 0.68 |
| 6. | 300 | 7.0 – 7.5 | 0.34 |
| 7. | 400 | 6.5 – 7.0 | 0.56 |
| 8. | 400 | 7.0 – 7.5 | 0.57 |
| 9. | 500 | 6.5 – 7.0 | 0.68 |
| 10. | 500 | 7.0 – 7.5 | 0.46 |
| 11. | 600 | 6.5 – 7.0 | 0.89 |
| 12. | 600 | 7.0 – 7.5 | 0.66 |
| 13. | 700 | 6.5 – 7.0 | 0.79 |
| 14. | 700 | 7.0 – 7.5 | 0.70 |
| 15. | 800 | 6.5 – 7.0 | 0.90 |
| 16. | 800 | 7.0 – 7.5 | 0.52 |
| 17. | 1,000 | 6.5 – 7.0 | 0.83 |
| 18. | 1,000 | 7.0 – 7.5 | 0.37 |
| 19. | 5,000 | 7.0 | 0.75 |
| 20. | 12,500 | 7.0 | 0.26 |
| 21. | 25,000 | 8.5 – 9.0 | 0.35 |
| 22. | 50,000 | 8.5 – 9.0 | 0.43 |
| 23. | 100,000 | 8.5 – 9.0 | 0.36 |
| 24. | 200,000 | 8.5 – 9.0 | 0.43 |
| 25. | 500,000 | 8.5 – 9.0 | 0.44 |
| 26. | 1,000,000 | 8.5 – 9.0 | 0.87 |

It can be seen from Table VI that the addition of substantially more than 100 parts per million results in a much lesser increase of degree of corrosion inhibition so that any amounts above 100 ppm do not increase corrosion inhibition to any substantial degree as contrasted to the addition of the compositions up to 100 ppm.

Phosphones and sulfonated lignin utilized in connection with Tables III-VI were identical in composition to those utilized in connection with the tests of Tables I and II.

Further tests were conducted on various other phosphones and are summarized in Table VII as follows:

TABLE VII

OTHER PHOSPHONES

| | | ppm | pH | mpy |
|---|---|---|---|---|
| 1. | Phosphone (DEQUEST 2029) | 15 | 6.5 – 7.5 | 0.44 |
| | Sulfonated Lignin | 10 | | |
| | Zn$^{++}$ | 5 | | |
| 2. | Phosphone (DEQUEST 2000) | 20 | 6.5 – 7.5 | 1.06 |
| | Sulfonated Lignin | 20 | | |
| | Zn$^{++}$ | 10 | | |
| 3. | Phosphone (DEQUEST 2006) | 20 | 6.5 – 7.5 | 0.65 |
| | Sulfonated Lignin | 20 | | |
| | Zn$^{++}$ | 10 | | |
| 4. | Benzene Phosphonic Acid | 20 | 6.5 – 7.5 | 0.84 |
| | Sulfonated Lignin | 10 | | |
| | Zn$^{++}$ | 10 | | |

These tests show that the phosphone or phosphine group is the primary cause of corrosion inhibition. The group attached to the phosphorous groupings may vary from aliphatic to aromatic and amino with no drastic change in corrosion inhibition. The only real effect is the change in chelating power due to the delocalization of available electrons.

The effect of utilization of sulfonated lignin containing components such as reduced sugars which produce carboxylic acid or which contained carboxylic acid as shown by a series of tests utilizing a composition of the following basic formula:

| Phosphone (DEQUEST 2029) | 10% |
|---|---|
| Sulfonated Lignin | 6.7% |
| Diethanolamine | 6.7% |
| Zinc Sulfate | 8% |
| Caustic Soda | As required for pH adjustment to 6.5 – 7.5 |
| Benzatriazole | 0.067% |

| | ORGANIC (NORLIG) TYPES | Sulfonated Lignin Description | ppm | pH | mpy |
|---|---|---|---|---|---|
| 1. | NORLIG 12 | sulfonated lignin with reducing sugars | 100 | 6.5 to 7.5 | 1.09 |
| | | sulfonated lignin with reducing sugars | 200 | 6.5 to 7.5 | 0.59 |
| 2. | NORLIG 22 | sulfonated lignin without reducing sugars | 100 | 6.5 to 7.5 | 1.34 |
| | | sulfonated lignin without reducing sugars | 200 | 6.5 to 7.5 | 1.33 |

— Continued

| | ORGANIC (NORLIG) TYPES | Sulfonated Lignin Description | ppm | pH | mpy |
|---|---|---|---|---|---|
| 3. | Maracell E | sulfone replaced (approx. 80%) by hydroxy (OH) groups in NORLIG 22 | 100 | 6.5 to 7.5 | 2.85 |
| | | sulfone replaced (approx. 80%) by hydroxy (OH) groups in NORLIG 22 | 200 | 6.5 to 7.5 | 1.59 |
| 4. | Chelig | sulfonated lignin plus α & β hydroxy carboxylic acid groups | 100 | 6.5 to 7.5 | 0.42 |
| | | sulfonated lignin plus α & β hydroxy carboxylic acid groups | 200 | 6.5 to 7.5 | 0.38 |

It has further been found that the components made in accordance with the invention have a much better chelating power with respect to scalant such as calcium carbonate than to phosphone alone. For example, tests were conducted comparing phosphone with a three component system of the present invention. Thus at a pH of 7.0 and a temperature of 28° C, a phosphone such as "DEQUEST 2029" had an effective raise in ppm of 20 ppm whereas the composition embodying the invention (10% "DEQUEST 2029," 8 percent zinc sulphate and 6.7 percent "NORLIG 12") had an effective raise of additive from 75 ppm to 150 ppm with a maximum amount of scalant held in 230 ppm. The result with the composition of the present invention was achieved with a much lesser amount of phosphones, namely, on the order of 4.5 to 9.0 parts per ppm.

The above results are summarized in the following table:

TABLE VIII

| | Temperature 28°C | pH 7.0 |
|---|---|---|
| ADDITIVE | ppm added | CaCO₃ held in Solution |
| New Composition | 75 ppm (4.5 ppm — DEQUEST 2029) | 2320 ppm |
| New Composition | 150 ppm (9.0 ppm — DEQUEST 2029) | 2550 ppm |
| DEQUEST 2029 | 20 ppm | 2100 ppm |

Although the three constituents, namely, the phosphone or sulfonated lignin or cation can be added individually to the water system, it is preferred that they be premixed. In case of premixing care must be exercised in order to maintain the various components in solution. A typical method of mixing the components is described in the following steps:

1. Place 30 gallons of water in a blender (20%)
2. Add 95 pounds of phosphone (DEQUEST 2029) (10%)
3. Add 76 pounds of zinc sulfate (8%)
4. Add 20 gallons water to 30 gallon drum (20%)
5. Add 64 pounds sulfonated lignin (NORLIG 12) to this with vigorous agitation (6.7%)
6. Add this mixture of Norlig to master mixer which has the phosphone and zinc sulfate
7. Add diethanolamine - 95 pounds (10%) (or any amine which complexes zinc)
8. Adjust the pH of this blend, add caustic soda to bring the pH into the range of 8.5 to 9.0
9. Bring the final volume adjustment up to 100 gallon capacity with water.

In order to determine the effect of the compositions in stagnant water conditions, tests were conducted with aerations and are summarized in Table IX as follows:

TABLE IX

STAGNANT STUDIES
(Visual Analysis)
(after 96 hours)

| Additive | ppm | General Observations |
|---|---|---|
| Tap Water | — | Badly rusted, much sediment in bottom |
| Phosphone | 15 | No discoloration of water, general light surface attack |
| Sulfonated Lignin | 10 | |
| Zinc | 8 | |
| Chromate | 25 | Deep pitting, much sediment in bottom of jar |
| Polyphosphate | .03 | |
| Ortho Phosphate | .03 | |
| Zinc | 9 | |
| Chromate | 57 | |
| Polyphosphate | 1.8 | Deep pitting, much sediment in bottom of jar |
| Ortho Phosphate | 1.1 | |
| Zinc | 2.7 | |

The visual analysis shows that the composition embodying the inventin inhibits corrosion better even in stagnant conditions.

We claim:

1. The method of treating water in a water system to retard the corrosion of the metals which contact the water in the system which comprises adding to the water a composition consisting essentially of a water soluble phosphone or phosphine in a concentration of about two ppm to 20 ppm, a water soluble sulfonated lignin in a concentration of about four ppm to 20 ppm, and a water soluble metal cation in a concentration of about one ppm to 10 ppm, said sulfonated lignin including a component selected from the group consisting of products which are oxidizable to form α carboxylic acid, β carboxylic acid, or mixtures of the two, said water soluble phosphone or phosphine being selected from the group consisting of

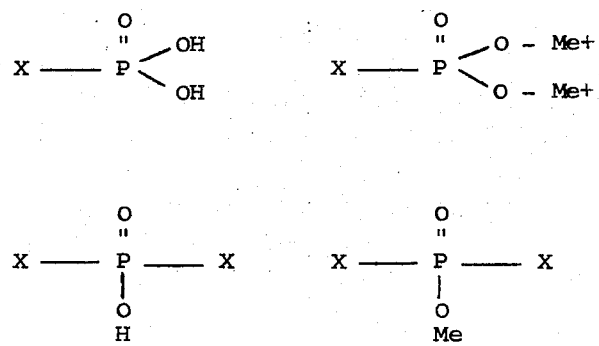

-Continued

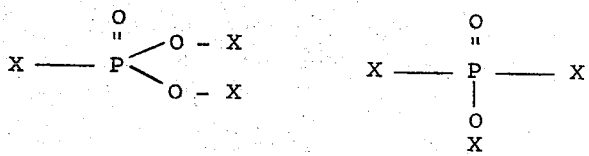

where $X$ = aromatic, aliphatic, or cyclic hydrocarbons with or without nitrogen sulfur, phosphorous, hydroxy groups, carboxy, Me = metal and maintaining the pH of the system between 6 and 9, said cation being selected from the group consisting of nickel, zinc, lead, cobalt, magnesium, antimony, tin and chromium or mixtures thereof.

2. The method set forth in claim 1 wherein said phosphone or phosphine comprises 1-hydroxyethylidene-1,1-diphosphonic acid.

3. The method set forth in claim 1 wherein said phosphone or phosphine comprises pentasodium tris methyl phosphonate.

4. The method set forth in claim 1 wherein said phosphone or phosphine comprises pentasodium, nitrilo tri (methylene phosphonic acid).

5. The method set forth in claim 1 wherein said phosphone or phosphine comprises benzene phosphonic acid.

6. The method set forth in claim 1 wherein said phosphone or phosphine comprises bis phosphonylmethyl phosphonic acid.

7. The method set forth in claim 1 wherein said phosphone or phosphine comprises tri-phenyl phosphine.

8. The method set forth in claim 1 wherein said phosphone or phosphine comprises tri-butyl phosphine.

9. The method set forth in claim 1 wherein said lignin is an unmodified sulfonated lignin.

10. The method set forth in claim 1 wherein the concentration of phosphone or phosphine ranges between 10 and 20 ppm, the concentration of cation ranges between 5 and 10 ppm and the concentration of sulfonated lignin ranges between 10 and 20 ppm.

* * * * *